Sept. 16, 1930.    D. L. MIDDENDORF    1,775,964
METHOD AND APPARATUS FOR FORMING GLASS ARTICLES
Filed Aug. 4, 1925    4 Sheets-Sheet 1

David L. Middendorf
INVENTOR.

BY
Edwin P. Carter
ATTORNEY

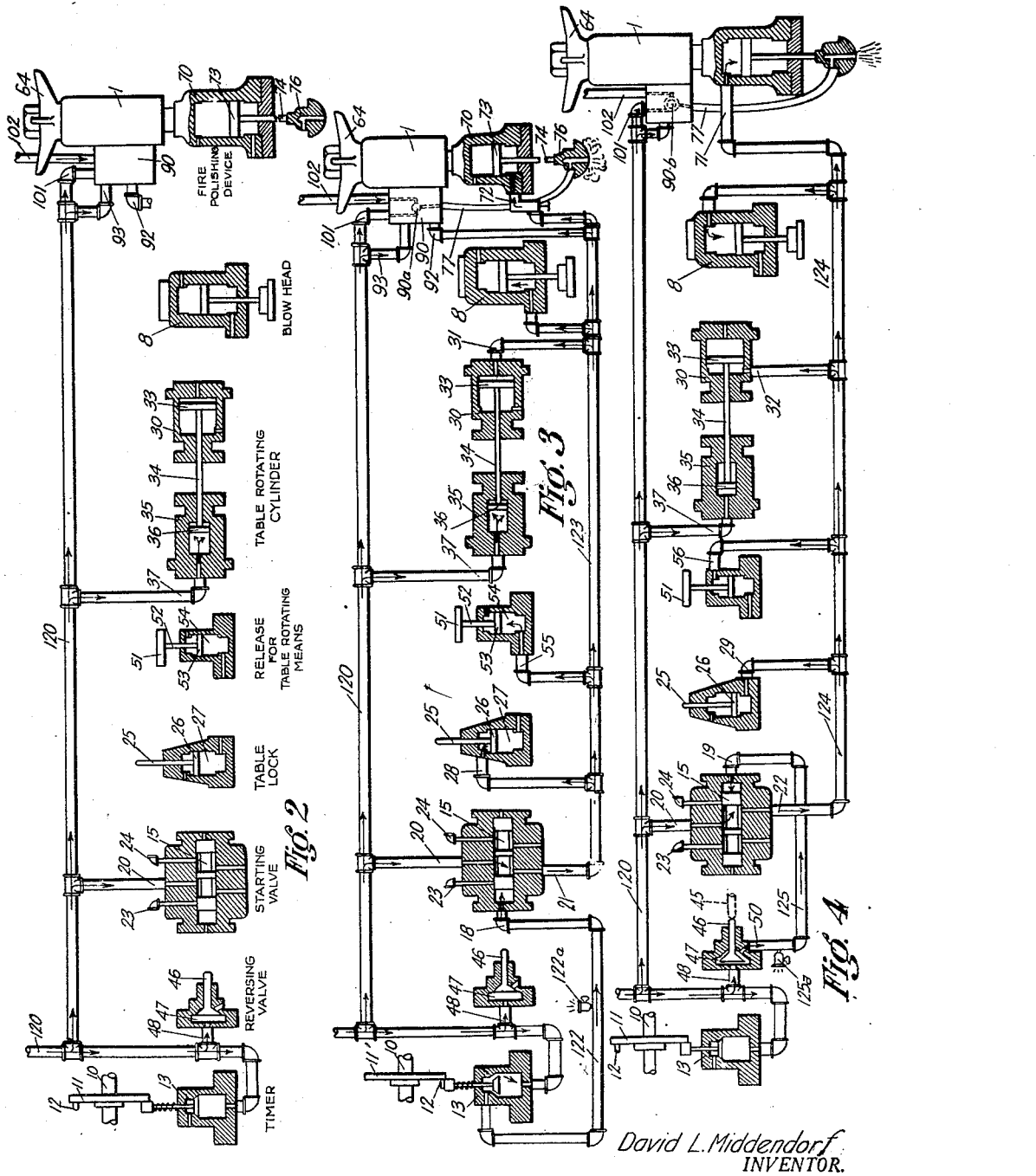

Sept. 16, 1930. D. L. MIDDENDORF 1,775,964
METHOD AND APPARATUS FOR FORMING GLASS ARTICLES
Filed Aug. 4, 1925 4 Sheets-Sheet 3

David L. Middendorf
INVENTOR.

BY Edwin P. Corkess
ATTORNEY

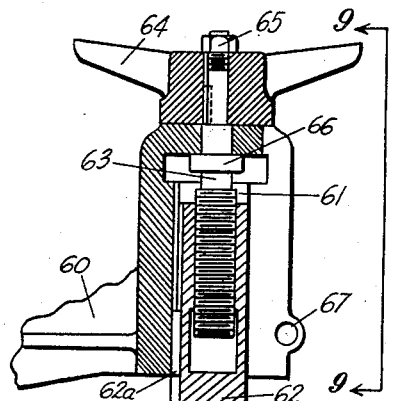

Patented Sept. 16, 1930

1,775,964

UNITED STATES PATENT OFFICE

DAVID L. MIDDENDORF, OF COLUMBUS, OHIO, ASSIGNOR TO THE FEDERAL GLASS COMPANY, OF COLUMBUS, OHIO, A CORPORATION OF OHIO

METHOD AND APPARATUS FOR FORMING GLASS ARTICLES

Application filed August 4, 1925. Serial No. 48,112.

My invention relates to a method and apparatus for forming glass articles and has to do, particularly, with the provision of a method and apparatus for treating shaped or partially shaped masses of molten glass, whereby the resultant articles of glassware are of a higher quality than articles heretofore produced.

In the manufacture of articles of glassware, the ware very frequently shows mold marks, caused by the contact of the hot glass with the relatively cold surface of the mold or other shaping implements. The mold or other shaping instruments may be of a comparatively porous material, and the surface of the glass which contacts with the implements may show the pores of such implements. Also any irregularities in the shaping implements which may be caused in the making thereof, such as tool marks, may show up in the surface of finished articles. The contact of the hot glass with the relatively cold surfaces, due to these, or other reasons, may cause a crinkling or roughening of the surface of the article.

In the manufacture of articles of glassware of high quality, the crinkled or roughened exterior surfaces of the articles caused by contact of the hot glass with the relatively cold shaping implements, is overcome by subjecting the outer surfaces of the articles, after they have attained their final form, and after removal from the shaping receptacle, to the heat of a furnace or the like. This subjecting of the article to heat is of such an extent as to soften the exterior surfaces and allow the glass to resolidify, free from the crinkles or roughness. This process is commonly known as fire-polishing. This fire-polishing produces a high brilliance and luster on the exterior surfaces of the article whereby the quality of the article is increased.

In glassware, it is desirable that the interior surfaces of most articles be as smooth as possible. One of the difficulties heretofore encountered in the manufacture of articles of glassware is that of producing an article with its inside surfaces having a brilliance, luster and smoothness comparable to that of its outside surfaces when such outside surfaces have been fire-polished.

The interior surfaces of articles of glass are crinkled or roughened by contact of the hot glass with the relatively cold shaping instruments similar to the manner in which the outside surfaces of articles are crinkled or roughened by contact with the surfaces of the relatively cold mold or other shaping instruments. Articles of glass frequently show marks caused by the crinkling or roughening of the interior surfaces of the article, by the shaping instruments, and the quality of the ware is thereby depreciated.

The fire-polishing process, which overcomes the marks produced on the outside of the article by the mold, or other shaping instruments, makes possible the production of articles of high quality, with the exterior surfaces of a high brilliance and luster. These articles, however, often show the marks produced on the interior surfaces, and this defect tends to lessen the quality of the article. Furthermore, the interior surfaces of the article do not have a brilliance and luster comparable to that of its outside surface. This dullness of the interior surfaces tends to reduce the brilliance and luster of the whole article, whereby the quality of the article is further lessened.

One of the objects of my invention is to polish the interior surfaces of articles of glassware, whereby the crinkles or roughness caused by the contact of the glass with the shaping instruments are removed, and the interior surfaces caused to have a high state of brilliance and luster.

Another object of my invention is the provision of an apparatus for forming articles of glassware whereby all of the surfaces of the article may be polished, and crinkles and roughness removed therefrom.

Another object of my invention is to provide for automatically fire polishing the interior surfaces of articles of glassware, whereby such surfaces are given a high brilliance and luster.

Still another object of my invention is the provision of means whereby articles of glassware, which are formed by being pressed and then finally shaped, are initially expanded before being finally shaped.

Still another object of my invention is the provision of means whereby articles of pressed, or pressed and blown glassware, may be fire-polished while such articles remain in the pressing and blowing machine.

A further object of my invention is the provision of an apparatus whereby an article of glass may be pressed, finally blown, and then fire-polished before removed from the shaping machine.

A further object is to bring all the walls of the partly shaped article to a uniform heat so it will expand equally when blown up, because otherwise the walls of the partly shaped article are sometimes shaped thin in some places and these thin places are cooled more than the heavier places, resulting in the formation of walls of uniform thickness in the finished article.

A further object of my invention is the provision of means whereby an article of glass may be pressed and then simultaneously fire polished and finally shaped.

For purposes of convenience, I have shown in the drawings, a glass-shaping machine with my invention associated therewith, and placed between the pressing plunger, and the blow head of the machine. I have shown the shaping machine provided with a suitable timer, and suitable means for rotating the table of the machine. It is to be understood that the timer, the rotating means, and the shaping machine may be of any desired type. Also, means of any desired kind may be used for feeding the molten glass into the molds of the shaping machine.

My method of forming articles of glassware may consist of polishing the articles of glassware, or shaped masses of glass, at different stages of its formation. It may consist of forming a mass of molten glass and then fire-polishing the surfaces of the formed glass, to complete the article. It may consist of shaping a mass of molten glass to form a blank, fire-polishing the surfaces of the blank, and then finally shaping the blank to form the completed article. My method may consist of shaping a mass of molten glass to form a blank, fire-polishing the surfaces of the blank, and initially expanding the blank, and then finally shaping the blank to complete the article. It may consist of shaping a mass of molten glass to form a blank, finally shaping the blank, and then fire-polishing the surfaces of the finally shaped blank before its removal from the shaping machine, to complete the article.

As shown in the drawings, for purposes of convenience, a mass of molten glass is first deposited in a mold of a shaping machine. The mold containing the mass of molten glass may now be caused to align with a pressing plunger, and the pressing plunger may be caused to press the molten glass into the various recesses of the mold, forming a blank. The pressing plunger is then lifted and the formed blank of glass transferred from the pressing mold to a blow mold.

The blow mold containing the blank is then brought into alignment with that apparatus of my invention, which may be termed the fire head. At the time of alignment the fire head is distanced from the mold, and gas and air under slight pressure, is burning in the mouth of the fire head in the nature of a pilot light. The fire head may now be moved into close proximity to the mold, and simultaneously, the pressure of gas and air, burning in the mouth of the fire head, is increased, resulting in a hot blast. As the fire head is moved close to the mold, the hot blast is directed into the interior of the formed glass in the mold. The movement of the fire head toward the mold containing the blank may be relatively slow, the speed of such movement being variable. By varying the speed in which the fire head moves toward the mold containing the blank, the length of time of playing the hot blast into the blank can be regulated as desired, and the intensity and extent of the treatment is thus variable.

In addition, the fire head is adjustable so that if desired it may be caused to seat upon the blow mold, or the closeness to which it approaches the blow mold may be varied, to meet various conditions and requirements. If desired, my invention may be employed to fully blow or form the ware with fire a hot blast instead of air.

The directing of the hot blast into the blank treats and polishes the interior thereof, and is effective to remove crinkles or roughness caused by the contact of the hot glass with the pressing plunger or other shaping instruments.

Furthermore, when the fire head is brought into close proximity with the blank of glass in the mold, with the hot blast of gas and air burning under pressure and issuing from the mouth of the fire head, this same pressure causes a slight expansion of the formed article of glass. This slight expansion of the article additionally assists in removing crinkles or roughness, and the blank thus slightly expanded is in a more desirable condition for final blowing. The fire head can be caused to move into any desired degree of closeness to the mold containing the blank, whereby the amount of initial expansion caused by the pressure may be regulated to suit different conditions and requirements.

The fire head may now be moved away from the mold, and simultaneously the pressure of the gas and air is reduced to such a point as to permit a slight burning thereof sufficient only for a pilot light. The movement of the fire head away from the mold is relatively fast, so that the hot blast will not be played upon the surfaces of the mold or other parts of the shaping machine.

The mold containing the blank, which now has its interior surfaces polished, may now be aligned with a blow head of any desired type, where the blank may be finally shaped, and after final shaping may be removed from the shaping machine in any desired manner.

It will be understood that I have thus described my method, to conform with the showing in the drawings, and that such showing in the drawings, and description of the method, are so made for the purpose of illustration only. I desire to have it understood that my apparatus may be associated with a shaping machine so that the article of glass may be polished at any desired step in its formation. Also, it is to be understood that my method is not to be limited to the structure shown and described, but that my method may be employed with any desired type of shaping apparatus, or with any desired type of timer for the shaping machine, or with any desired means for feeding the molten glass into the molds of the shaping machine. I further desire it to be understood that my device may be used to polish the surfaces of articles of glassware, which articles are pressed only, and are not blown.

Various other objects of my invention will be brought out in the following specification and the claims appended hereto. The various objects of my invention are preferably obtained by the structure illustrated in the drawings wherein similar characters of reference designate corresponding parts and wherein:

Figure 2 is a diagrammatic view, showing the system of pipes conducting air under pressure, and showing the parts of the glass-shaping machine and fire-polishing device to which such air under pressure is conducted.

Figure 3 is a diagrammatic view, showing the system of pipes conducting air under pressure, and the parts to which such air is conducted, and also showing one system of pipes which conducts air under pressure intermittently, and the parts to which such intermittent air is conducted.

Figure 4 is a diagrammatic view, showing the system of pipes conducting air under pressure, and the parts to which such air is conducted, and also showing still another system of pipes which conducts air under pressure intermittently, and the parts to which such intermittent air is conducted.

Figure 8 is a vertical sectional view of the fire-polishing device, showing the manner in which it is attached to the glass-shaping machine.

Figure 9 is a side elevation of the support for the fire-polishing device, looking in the direction of the arrows 9—9 of Figure 8.

Figure 10 is a longitudinal sectional view of the injector.

Figure 11 is a section taken on line 11—11 of Figure 10, showing the manner in which air under pressure is conducted through the injector.

Figure 12 is a section taken on line 12—12 of Figure 10, showing the manner in which gas is conducted through the injector.

Figure 1:
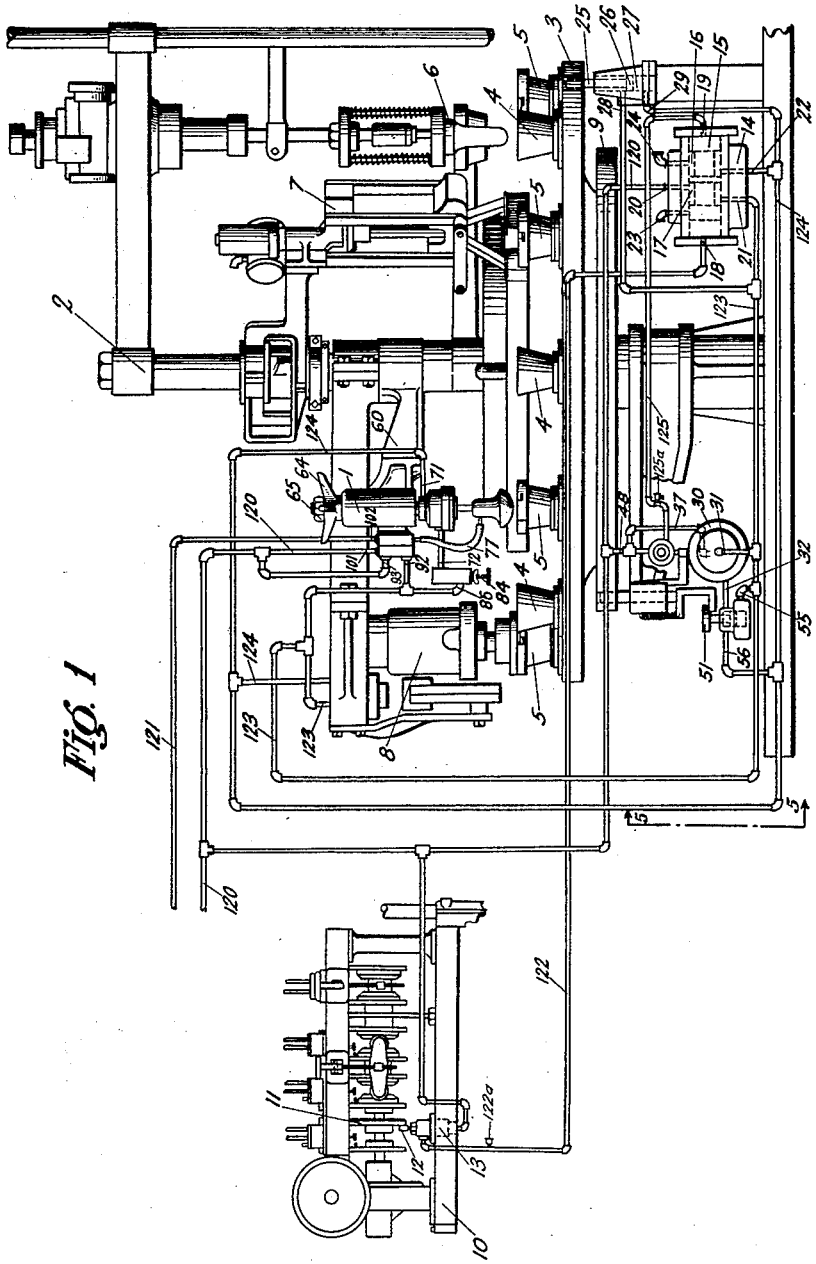
Figure 1 is a front elevation of a conventional glass-pressing and blowing machine, together with a suitable timer for the machine, showing my invention associated therewith.

In order to facilitate an understanding of my invention, I have prepared a diagrammatic showing in three figures, illustrating many of the important structural elements of my invention, showing their manner of operation free from the numerous details of actual construction. These figures are the Figures 2, 3 and 4.

In these figures will be seen the timer, which admits intermittent puffs of air under pressure, timing the operation of the machine; the reversing valve which is opened intermittently, admitting puffs of air under pressure in timed relation to the puff of air admitted from the timer, to reverse the condition set up by the timer; and the starting valve, to the opposite ends of which the puffs of air from the timer and reversing valve are conducted. Also, in these figures will be seen the table lock which locks the table of the glass-shaping machine in fixed position at the proper time; the cylinders of the mechanism which causes rotative movements of the table; the release member, which causes a disconnection between the table, and the table rotating mechanism at the termination of a rotative movement; the blow head of the glass-shaping machine; and the device for fire polishing the glassware.

In Figure 3, I show the structural elements, the piping system 120 which conducts air under constant pressure and the piping system 123 which leads from the starting valve and which conducts air under pressure intermittently. In this figure, I show the valve 13 of the timer in open position, the lug 12 opening the valve, which admits a puff of air past the valve, into the pipe line 122, and thence into the starting valve through the pipe connection 18 thereof. This puff of air pushes the piston 15 of the starting valve to the position shown in this figure. The pipe line 122 has a restricted opening 122ª which permits of a gradual leakage of the air pressure from this pipe line, but such leakage is not sufficient to interfere with the operation of the piston 15.

With the piston 15 of the starting valve in this position, as shown in Figure 3, constant air in the line 120 passes through the starting valve into the line 123. The air in this line sets up one of the two general conditions in the operation of the machine. This line conducts air to the table lock through the pipe connection 28 thereof; to the release member for the table-rotating means through the pipe connection 55 thereof; to the cylinder 30 of the table-rotating mechanism through the pipe connection 31 thereof; and to the blow head of the glass-shaping machine. In addition, the pipe line 123 admits air into the cylinder 70 of the fire-polishing device through the pipe connection 72 and into the injector through the pipe connection 92.

In this case, the mold-carrying table of the glass-shaping machine is unlocked by the downward movement of the member 25, and the table is rotated by the movement of the piston 33 in the cylinder 30, and the release member 51 is moving upward so that a portion of the table-rotating mechanism may be caused to move under the member 51 when the table-rotating mechanism reaches the end of its movement. Also, the piston 73 of the fire head device is caused to move upward, in turn, moving the fire head 76 to its upward or inoperative position. The air entering the injector through the connection 92 causes a movement of the valve in the injector so that the mixture of gas and air through the pipe connections 101 and 102 is decreased, as shown by the area 90ª permitting a burning of low intensity in the mouth of the fire head 76, in the nature of a pilot light.

In Figure 4, I show the structural elements together with the piping system 120 which conducts air under constant pressure, and the piping system 124 which conducts air under pressure intermittently. The air in line 124 controls the second one of the two general conditions in the operation of the machine. In this figure, the lug 12 has passed out of contact with the valve in casing 13, this valve now being seated. The reversing valve 46 is opened by the member 45 of the table-rotating mechanism striking such valve, when the piston 33, together with the rotating mechanism approaches the end of its forward movement. (See Figure 5.)

Upon the opening of this valve 46 a puff of air is admitted into the line 125, thence into the starting valve through the pipe connection 19. This moves the piston 15 to the position shown in Figure 4, and such movement is permitted because the pressure in the pipe line 122 has seeped out through the restricted opening 122ª, as shown in Figure 3. The pipe line 125 has a restricted opening 125ª to permit exhaust of air in the pipe line 125, and to allow the reverse movement of the piston 15, when the valve 13 of the timer is again opened.

In this position, constant air from line 120 passes through the starting valve and into the line 124. This air line conducts air to the table-locking means through the pipe connection 29; to the release for the table rotating means through the pipe connection 56; and into the cylinder 30 of the table-rotating means through the pipe connection 32. Air is also conducted by this line into the blow head 8, and into the cylinder 70 of the fire-polishing device through the connection 71 thereof.

In this condition, we have the table lock 25 moving upward to lock the table; the blow head is moved downward into operative position; the table-rotating mechanism is released from the table by the downward movement of the member 51 (see Figure 5) and the table rotating mechanism is caused to move backward in a direction the reverse to that previously described, free from the table, by the air entering the cylinder 30 through the connection 32. At this time, the fire head of the fire-polishing device is caused to move downward into operative position by the air entering the cylinder 70 through the pipe connection 71 thereof. Also, the mixture of gas and air in the injector is increased, as indicated by the area 90ᵇ, which increased flow of gas and air is conducted to the fire head 76 through the piping 77, whereby the intensity of the flame burning in the mouth of fire head 76 is increased.

Following this condition, the timer valve 13 is again opened for an instant and the operations just described are repeated.

Referring now to Figure 1, I show my fire-polishing device, as designated by the numeral 1, associated with a conventional type of glass-shaping machine 2. The glass-shaping machine has a suitable table 3 having mounted thereon pressing molds 4 and blowing molds 5.

The glass-shaping machine has a pressing plunger 6, a transfer device 7 and a blow head 8. Positioned below the mold carrying table is a secondary table 9, for rotating the mold carrying table, the operation of which will be presently described.

A suitable timer 10 is provided, and may be rotated by any desired means. The timer is provided with a disc 11 having a lug 12 attached near the periphery of the disc, and a valve 13 positioned in the path of the lug 12 carried by the rotating disc 11.

Figure 7:
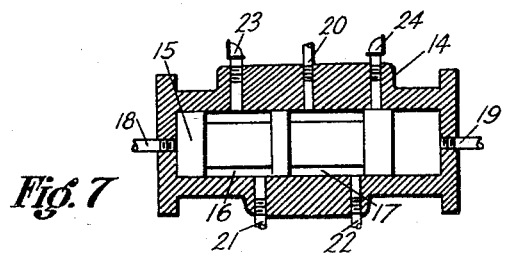
Figure 7 is a vertical sectional view of the starting valve, which controls the two general conditions of the machine.

The starting valve of the machine, as best shown in Figure 7, is indicated by the numeral 14 and comprises a cylinder with a piston 15 operating therein and having reduced portions to form cavities 16 and 17. The starting valve is provided with pipe connection 18 at one end of the cylinder and a connection 19 at the opposite end thereof. The valve is also provided with a connection 20 located centrally of the piston, and with pipe connections 21 and 22 extending oppositely from the pipe connection 20. Suitable exhausts 23 and 24 are provided in the valve, and which extends oppositely from the pipe connections 21 and 22.

The mold carrying table is provided with a lock, consisting of a bolt 25 with a piston 26 on one end of the bolt operating in a cylinder 27, which cylinder 27 has pipe connections 28 and 29.

Figure 5:
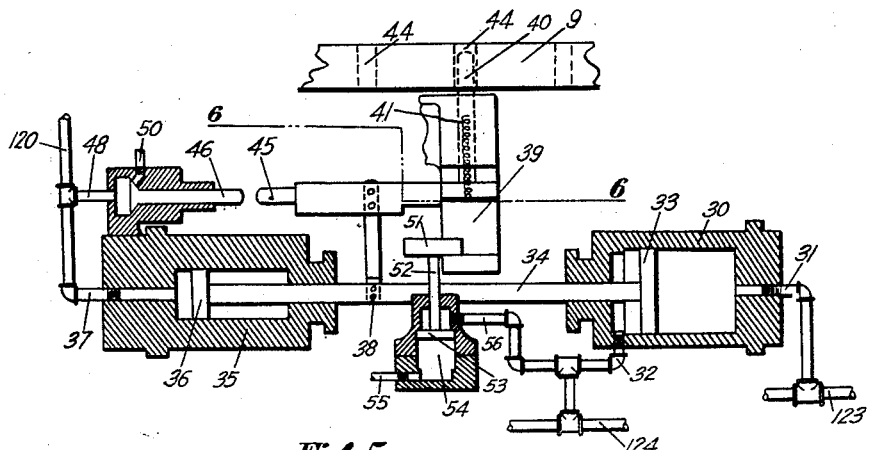
Figure 5 is an enlarged detail view of the table rotating means, partially in section, looking in the direction of the arrows 5—5 of Figure 1.
Figure 6:
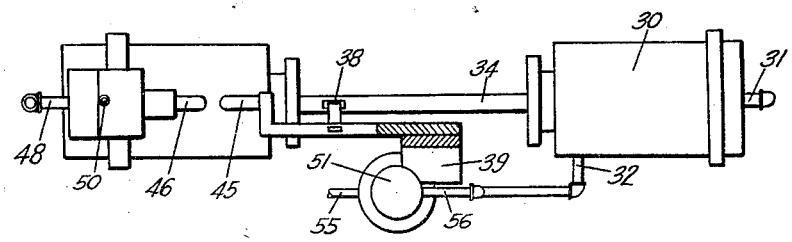
Figure 6 is a top plan view, partly in section, of a portion of the table rotating means shown in Figure 5.

The shaping machine is provided with a table rotating means, as best shown in Figures 5 and 6. The rotating means comprises a cylinder 30 having pipe connections 31 and 32 in opposite ends thereof, and a piston 33. The piston has a rod 34 extending out of the cylinder 30 and into a cylinder 35. A suitable piston 36, of smaller diameter than the piston 33, is attached to the rod 34 and operates in the cylinder 35. The cylinder 35 has a pipe connection 37 in one end thereof. Attached to the rod 34, as shown at 38, is a table-moving means, comprising a hook member 39 and a plunger or bolt 40. The hook 39 and bolt 40 are rigidly associated with each other and are actuated in an upward direction by the spring 41. The bolt 40 operates in recesses 44 in the rotating table 9. The table rotating means has an outstanding lug 45 adapted to cooperate with the reversing valve 46. The reversing valve 46 operates in a chamber 47, which chamber has a pipe connection 48 in one end thereof and a pipe connection 50 in the opposite end.

When the table rotating means approaches the end of its movement in rotating the table, the lug 45 carried by the rotating means strikes the reverse valve 46. This opens the reverse valve 46 for an instant and admits a puff of air through the valve to one end of the starting valve 14, and this puff of air sets up a condition in reverse to that set up by the timer, as will presently be seen.

A suitable catch or hook, as shown at 51, is provided to cooperate with the hook 39 of the table-rotating means. The catch 51 is mounted on a rod 52, which rod has on its opposite end a piston 53 operating in a cylinder 54. The cylinder has pipe connections 55 and 56 in opposite ends thereof.

The fire-polishing device is attached to the glass-shaping machine by means of the bracket 60, as best shown in Figure 8. The bracket 60 terminates in a cylinder-like end portion as shown at 61. This cylinder-like portion is split throughout its length, as best shown in Figure 9. On opposite sides of the split, the bracket is provided with bosses 67 and 68. The boss 68 has a hole therethrough which allows the passage of a bolt 69, and the boss 67 is internally threaded to receive the threaded end of the bolt 69.

The fire-polishing device has a shank 62 which fits into the cylinder-like end portion of the bracket 60 and which shank is prevented from rotation therein because of a key $62^a$ positioned in key-ways in the shank 62 and in the interior wall of the cylinder.

The shank 62 has a recess therein, which recess is threaded and adapted to receive the threaded end portion of a shaft 63. The shaft 63 has a collar 66 which contacts with the upper interior surface of the cylinder-like member of the bracket, and the shank 63 extends through the top of the cylinder and has attached to its upper end a member 64 similar to a winged nut. This member 64 is keyed to the shaft 63, and is held in position by the nut 65 fitting on the threaded upper end of the shaft 63.

The cylinder-like end portion of the brace 60 is clamped around the shank 62 by drawing together the faces of the split in the cylinder member, by turning the bolt 69. A fire head is thus adjustably mounted in this end portion of the bracket. In order to make an adjustment of the fire head, the nut 69 may be loosened whereby the cylinder does not tightly clamp the shank 62, and then the winged nut 64 may be rotated as desired, causing a rotation of the member 63. The rotation of the member 63 causes a raising or lowering of the shank 62 by reason of the action of the threaded portions of the members 62 and 63. During such adjustment the shank 62 is prevented from rotation in the cylinder-like member by the key $62^a$. In making an adjustment, to cause a lowering of the fire head, the collar 66 of the shaft 63 contacts with the interior surface of the top of the cylinder-like member, thus rigidly retaining the position of the shaft 63, and forcing the shank 62 downwardly. In making an adjustment, to raise the fire head, the winged nut 64 contacts with the outer surface of the cylinder, maintaining the shaft 63 in fixed position, and by the action of the threaded portions of the shank 62 and shaft 63, the shank 62 is drawn upwardly into the cylinder. After any desirable adjustment has been made in raising or lowering the fire head, the bolt 69 may be tightened and the adjustment thus maintained.

The fire head further comprises a cylinder 70, having a pipe connection 71 in one end thereof and a pipe connection 72 in the opposite end. Operating within the cylinder 70 is a piston 73 having a piston rod 74 extending out of the cylinder, which is screw threaded upon its extremity as at 75. A fire head 76 is internally threaded and adapted to be fitted upon the screw threaded extremity of the piston rod 74. The fire head 76 has a flexible pipe connection 77 and an open mouth 78.

From this it will be seen that in addition to providing a fire head which has a reciprocating movement, by the action of the piston 73 in the cylinder 70, I have provided an adjusting means for regulating the path of such reciprocable movement. By the use of this adjusting means, the path of movement of the fire head may be so regulated that the fire head 76 may be caused to approach a mold carrying a blank of glass to any desired degree of closeness, or if desired, the path of the fire head may be so regulated that it will seat upon such mold, or upon the glass in the mold.

Positioned in the air line which connects with the pipe connection 72 is a check valve 80. This check valve is a combination of a ball and needle valve. The ball 81 operates in the chamber 82, which chamber has slanting sides as shown in 83. The ball 81 is adjusted to any desired distance from the sides 83 by the needle 84, having a nut 85 for maintaining the desired adjustment. This adjustment is adapted to regulate the flow of air past the ball 81 upon the downward movement of the fire head piston 73. The check valve is provided with a pipe connection 86 on the opposite side of the ball from the pipe connection 72.

The injector used with my fire head as shown in Figure 10, comprises a body 90 having a cylinder 91 with pipe connections 92 and 93. Operating in the cylinder is a differential piston 94 with a rod 95 extending therefrom and operating in a chamber 96. The chamber 96 has ports 97 and 98 adapted to be aligned with circumferential grooves 99 and 100 in the rod 95, upon movement of the rod 95 to the proper position.

The injector 90 has pipe connections 101 and 102. The connection 101 supplies air under constant pressure and communicates with the port 98, which port 98 in turn communicates with the chamber 103 through the groove 100 in the rod 95, and which chamber communicates with the chamber 104. The pipe connection 101 also communicates with the chamber 104 through the restricted passage of the orifice plug 105, (see Figure 11).

The pipe connection 102 supplies gas under pressure and communicates with the port 97 which in turn communicates, through the groove 99 in the rod 95, with the chamber 106, which chamber communicates with the chamber 107 through the several orifices 108. Positioned in the line 102, is an orifice plug 111, which plug permits passage of proper amount of gas. The pipe connection 102 also communicates with the chamber 107 through the restricted passage of the orifice plug 109 (see Figure 12).

The chamber 104 communicates with the passageway 110, and both the passageway 110 and chamber 107 communicate with the Venturi tube 112, from which tube leads the pipe 77. The pipe 77 enters the fire head 76 of the fire-polishing device, and communicates with the mouth 78 of such fire head.

In operation, air under constant pressure is admitted to the cylinder 91 through the pipe connection 93. Air under pressure is intermittently admitted to the cylinder 91, through the pipe connection 92. The air admitted through the connection 92 acts on the face of the piston 94, having an area greater than that face of the piston on which acts the air admitted through the connection 93. Thus, when air is admitted through connection 92, it moves the piston and rod 95 to the left, disaligning the ports 97 and 98 with the grooves 99 and 100. When the air admitted through the connection 92 is cut off and exhausted, the constant air entering through connection 93 forces the piston and rod back to the position shown in Figure 10, realigning the ports and grooves as above set forth.

When the air under pressure entering through pipe connection 92 is cut off and exhausted, the piston 94 is moved to the position shown in Figure 10, and air under pressure is conducted through the pipe connection 101, through the port 98 in the body of the injector 90, through the groove 100 in the rod 95, and through the chamber 103, then through the chamber 104, and then into the passage 110. In a like manner gas under pressure is conducted through the pipe connection 102 through the port 97 in the body of the injector 90, thence through the groove 99 in the rod 95, through the chamber 106, through the several orifices 108 and into the chamber 107. The air under pressure in the passageway 110, and the gas in the chamber 107 now enter, and mix, in the Venturi tube 112, from which point such gas and air is conducted to the fire head through the pipe 77, and the burning of such gas and air in the mouth of the fire head takes place under pressure.

In the continued operation, air under pressure is admitted through connection 92 and the piston 94 moves to the end of the cylinder having the pipe connection 93, and the grooves 99 and 100 in the rod 95 will be disassociated from the ports 97 and 98, whereby connection of the pipes 101 and 102 through the chambers 103 and 106 is cut off. In this position the pipe connection 101 communicates with the passage 110 by the restricted opening 105 only, (see Figure 11) and in similar manner pipe connection 102 connects with chamber 107 through the restricted opening 109 (see Figure 12). The quantity of gas and air now passing through the injector and mixing in the Venturi tube 112 is reduced, so that the intensity of the burning of the gas and air in the fire head is reduced, and only a pilot light remains.

The fire-polishing unit is supplied with gas under constant pressure from any desirable source by means of the pipe line 121, which connects into the injector 90 through the pipe connection 102.

It will be understood that the pressing plunger 6 of the shaping machine and the transferring means 7 are supplied with suitable power, such as air pressure from any desirable source, which source, if desired, may be separate from that supplied to the machine by the pipe line 120. It will, furthermore, be understood that the plunger 6, and the transferring means 7, in operation, are suitably timed either from the table 3 or from the timer 10, as desired.

In operation, the timer 10 is suitably rotated and the lugs 12 on the disc 11 strikes the valve 13, admitting a puff of air to the line 122, thence through the connection 18 into the starting valve 14. The line 122 has a restricted opening 122$^a$ to permit of the exhaust of air therein, the opening being positioned adjacent the valve 13. This opening is not of sufficient size to prevent the operation of the starting valve when the puff of air is admitted into the line 122. This restricted opening will allow a gradual leakage of the pressure in line 122 after the piston 15 in the starting valve 14 has been moved into the position as shown in Figure 4.

The puff of air thus admitted into the line 122 moves the piston 15 into position shown in Figure 7. This permits of the connection of the air in line 120 through the connection 20 of the starting valve through the groove 17 and out through the connection 21. At this time the connection 22 is connected through the groove 16 to the exhaust 24. The air pressure is now conducted into line 123 to the connection 28 of the table-locking means, where it operates on the piston 26 and unlocks the table 3. At the same time air is admitted to the cylinder 30 of the rotating mechanism through connection 31 (see Figure 5), causing a movement from right to left of the piston 33, the rod 34 and the same movement of the table-rotating means 39. The movement of the member 39 causes a movement of the rotating table 9 because the lug 40 of the member 39 is engaged in a recess 44 of the rotating table 9, which rotating table in turn causes a rotative movement of the mold-carrying table.

Simultaneously with the unlocking and rotating of the table, air under pressure is admitted from the pipe line 123 through the pipe connection 55 into the cylinder 54, and raises the piston 53 and hook 51. This hook member 51 is raised so that a portion of the member 39 of the table-rotating mechanism may pass under the hook 51, and at the end of the rotative movement of the table, and upon the locking of the table, the member 51 will be caused to move downwardly, bringing with it the member 39, so that the lug 40 will be removed from the recess 44. (See Figure 5.)

The movement from right to left of the piston 33 of the cylinder 30 is somewhat retarded or slowed by the fact that air under pressure is admitted to the cylinder 35 and cushions such movement.

The pipe line 123 conducts the air under pressure to the blow head and to the fire head. Simultaneously with the unlocking of the table and the rotating of the table, the air in the line 123 causes the blow head 8 to lift. The air from line 123 enters the injector through the connection 92. Owing to the fact that the piston 94 is a differential piston, the air admitted through connection 92 moves the piston 94 in the cylinder 91 and causes a disalignment of the grooves 99 and 100 in the rod 95 with the ports 97 and 98. Thus, the air and gas entering through connections 101 and 102 are disconnected from the chambers 110 and 107, except for the restricted openings 105 and 109. These restricted openings admit such quantity of gas and air into the line 77 as to cause only a slight burning of the fire in the mouth 78 of the fire head. The injector may be so arranged, for example, by inserting blank orifice plugs in the restricted openings 105 and 109, so as to entirely cut the mixture of gas and air between mold presentations, and so that when the fire head 76 moves downward into operative position, the gas and air issuing therefrom will be ignited by the hot glass in the mold.

When the full pressure of gas and air is cut off as above described, air pressure is at the same time admitted into the cylinder 70 through the connection 86, through the check valve and through the connection 72. It will be observed that the air pressure traveling in this manner through the check valve will lift the ball 81 and the air will have rapid movement into the cylinder 70, whereby the piston 73 and head 76 have a rapid upward movement.

The table is now unlocked, it is rotated by the movement of the piston 33 of the cylinder 30, the blow head is lifted, the fire head or polishing means is lifted and the pressure of the air and gas burning in the mouth of the fire polisher is decreased to such degree that only a pilot light remains.

During the above movement of the mold table, and as the mold table approaches the end of its forward movement, the finger 45 moving with the rotating means 39 now strikes the valve 46. The operation of this valve admits air pressure from line 120, through connection 48 into the line 125. The line 125 connects with the starting valve through the connection 19 and forces the piston 15 to the opposite side of the cylinder.

The air under pressure which was admitted through the pipe connection 18 is now exhausted by the restricted opening 122ᵃ in the line 122, as has already been described.

Upon the movement of the piston 15 to the opposite side of the cylinder, constant air is admitted through the pipe connection 20, through the chamber 16 and out through the pipe connection 22. At the same time, the air pressure existing in line 123 is exhausted by the connection of that line through pipe connection 21, chamber 17 and exhaust 23.

The air pressure now in line 124 is conducted to the table-locking means through the pipe connection 29 thereof, and operates to force the piston 26 and plunger 25 upward, the plunger 25 engaging in a suitable recess in the table 3, thereby locking the same.

Simultanenously with the locking of the table, air pressure is admitted to the cylinder 30 of the rotating mechanism, through the pipe connection 32. Also, air pressure is admitted to the cylinder 54 operating on the piston 53 therein, which forces the hook or catch member 51 in a downward direction. As best shown in Figure 5, the hook member 51 engages the member 39, pulling the member 39 downward and thus disengaging the lug 40 of the member 39 from the recess 44 of the rotating table. The pressure now forces the piston 33 through the cylinder 30, and the movement of the piston 33 carries the table-rotating means 39 with it, and at the end of the movement, the dog or lug 40 is caused to engage in another recess 44, by the action of the spring 41. The table rotating mechanism is now at the extreme right end of its movement and the lug 40 is engaged with another one of the recesses 44. In this position, the mechanism is ready to again rotate the table, when air is admitted to the cylinder 30 through the pipe connection 31.

Air pressure is conducted by the line 124 to the blow head, and to the fire-polishing means, by means of the pipe connection 71 thereof.

The table is now in locked position, the blow head is forced down into operating position and the fire-polishing means is forced down by admission of air pressure through the connection 71 to the cylinder 70, and the table rotating means is being moved back to engage in a new hold in table 9 in preparation for the next movement of the table.

At this time the pressure in the line 123 is being exhausted through the port 17 and the exhaust valve 23 of the starting valve 14.

The pressure thus being removed from the pipe line 123, the air pressure coming into the cylinder through the connection 71 forces the piston 73, together with the fire head 76, downwardly and into close proximity to the blank in the blow mold. This movement, however, is retarded because of the fact that the air lying below the piston 73 must be exhausted through the line 72 around the check valve ball 81, thence through the connection 86 into the line 123. It will readily be seen that air passing past the check valve in this direction will be restricted and retarded, the degree of restriction and retardation being determined by the position of the adjusting needle 84. The position of the ball may be regulated as desired by the needle 84 to restrict the flow of air past it more or less, it being understood that the downward movement of the piston 73 and fire head 76 takes place at the time air is being exhausted through the starting valve exhaust 23, the rate of exhaust from beneath the piston 73 being regulated by the ball 81. Thus, the movement of the fire head in the direction of the blank in the blow mold is retarded or slowed to any desired degree to meet different conditions and requirements.

Simultaneously with the locking of the table, the downward movement of the blow head, and the downward movement of the fire head, the pressure is removed from the injector through the pipe connection 92 (see Figure 10). Upon removing this pressure, the constant air supplied through connection 93 forces the piston to move in the cylinder 91, whereby the groove 100 is aligned with the port 98, and the groove 99, in the rod 95, is aligned with the port 97. Thus, the admission of gas and air into the tube 77 is greatly increased, whereby the intensity of the flame burning in the mouth 78 of the head 76 is increased, for the purpose of fire polishing the interior of a blank.

At this time, upon the continued rotation of the timer 10, the lug 12 strikes the valve 13, admitting a puff of air through the line 122 through the connection 18, into the starting valve 14. This moves the piston 15 back to the opposite end of the cylinder, and the operation just described is repeated. The line 125 which connects the starting valve 14 through the pipe connection 19 has a restricted opening 125ᵃ similar to that in line 122. Thus, when the piston 15 is moved by air through the connection 18 towards that end of the cylinder containing the connection 19, the air pressure in the connection 19 and line 125 has seeped out, allowing free movement of the piston 15.

Thus, it will be seen that I provide a fire-polishing device which reciprocates to and from blanks of glass in a mold wherein the movement towards the blank may be retarded to any desired speed, whereby the treatment of the glass may be regulated so as to meet various conditions and requirements, and wherein the movement away from the blank is relatively fast, whereby the flame of the fire-polisihng device is not played upon the mold, or other parts of the shaping machine. As the fire head moves toward the blank, the pressure of the gas and air burning in the mouth 78 is increased, causing a hot blast, which hot blast is directed into the blank, thereby polishing the interior surfaces thereof. It will also be seen that when the fire head moves away from the blank the pressure of gas and air burning in the mouth 78 is reduced, so that there remains only a pilot light or small flame burning under light pressure. Also, this flame may be cut off at this time as above explained.

It will, furthermore, be observed that while the polishing is being done that the pressure of the gas and air burning in the mouth 78 extends into the blank and slightly expands the same, whereby the blank is in a more desirable condition for final shaping. The manner in which the fire polishing and initial expanding of the blank can be regulated by the change in the speed in which the fire head moves toward the blank, or by the change in the path of the fire head, has been pointed out. Furthermore, the path of the fire head may be so regulated as to cause the fire head to seat upon the mold, whereby the fire polishing and final shaping of the blank may be performed simultaneously.

It is further seen that with my invention, in the making of pressed and blown ware, the blank may be first formed and then given a heat treatment before final shaping, at the same time applying sufficient fluid pressure to the interior of the blank to initially expand it to remove and eliminate any crinkles or the like. Furthermore, in the use of my invention the interior of the walls of the blank are given such a heat treatment that the walls thereof are brought to a uniform and even temperature so that in final blowing the walls will be blown out to final form in an even and uniform manner, giving the walls of the article a uniform thickness. This eliminates uneven wall thickness due to the walls of the blank being of uneven temperature.

I have shown my device as associated with a shaping machine of conventional type with a suitable timer therefor, and suitable rotating means for the table of the shaping machine. I desire it to be understood, however, that such showing is for the matter of convenience, and that the fire-polishing device may be used in glass-shaping machines of any desired kind, or with any desired type of timers or with any desired type of machines for feeding the glass into the shaping machine.

Having described my invention, I claim:

1. In a machine for shaping molten glass, a mold carrier, press molds on said carrier, blow molds on said carrier, a neck ring, means for pressing glass in said press molds, means for blowing said pressed blank in said blow molds, an automatic transfer mechanism for transferring said pressed blanks from said press molds to said blow molds, and means for throwing a flame downwardly into each blank while said blank is in the blow mold and before it is blown to final form.

2. In a machine for shaping molten glass, a mold carrier, press molds on said carrier, blow molds on said carrier, a neck ring, means for pressing glass in said press molds, means for blowing said pressed blank in said blow molds, an automatic transfer mechanism for transferring said pressed blanks from said press molds to said blow molds, a means for throwing a flame downwardly into each blank while said blank is in the blow mold and before it is blown to final form, and means for automatically decreasing the heat of the flame applied to the mold carrier and other parts in between treatment of successive blanks.

3. In a machine for shaping molten glass, a mold carrier, press molds on said carrier, blow molds on said carrier, a neck ring, means for pressing glass in said press molds, means for blowing said pressed blank in said blow molds, an automatic transfer mechanism for transferring said pressed blank from said press molds to said blow molds, a means for throwing a flame downwardly into each blank while said blank is in the blow molds and before it is blown to final form, and means for automatically causing said last-named means to assume a position relatively remote from the mold carrier and associated parts during the movement of said carrier.

4. In a machine for shaping molten glass, a mold carrier, press molds, blow molds, a neck ring, means for pressing glass in said press molds, means for blowing said pressed blanks in said blow molds, an automatic transfer mechanism for transferring said pressed blanks from said press molds to said blow molds, means for throwing a flame downwardly into each pressed blank before final blowing, and means for adjusting said last-named means to vary its proximity to said blanks when in operative position.

5. In a machine for shaping molten glass, a mold carrier, press molds, blow molds, a neck ring, means for pressing glass in said press molds, means for blowing said pressed blanks in said blow molds, an automatic transfer mechanism for transferring said pressed blanks from said press molds to said blow molds, means for throwing a flame downwardly into each pressed blank before final blowing, means for automatically moving said last-named means towards and from said carrier, and means for varying the path of movement of said means for throwing a flame.

6. The method of forming articles of glassware which comprises forming a shaped blank, initially expanding said blank by the application of gas and air burning under pressure and then finally shaping said blank by blowing it in a blow mold.

7. The method of forming articles of glassware which comprises forming a shaped blank and then expanding said blank by the application of gas and air burning under pressure.

8. The method of forming articles of glassware which comprises forming a shaped blank and then expanding and polishing said blank by the application thereto of gas and air burning under pressure.

In testimony whereof I hereby affix my signature.

DAVID L. MIDDENDORF.